United States Patent [19]

Dumitrascu et al.

[11] Patent Number: 5,111,995
[45] Date of Patent: May 12, 1992

[54] DRIP IRRIGATION TUBE

[75] Inventors: Octavian P. Dumitrascu, Fountain Valley; Charles A. McMillen, Alta Loma, both of Calif.

[73] Assignee: Rain Bird Sprinkler Mfg. Corp., Glendora, Calif.

[21] Appl. No.: 630,309

[22] Filed: Dec. 18, 1990

[51] Int. Cl.⁵ .............................. B05B 15/00
[52] U.S. Cl. ................................ 239/542
[58] Field of Search .......................... 239/542

[56] References Cited

U.S. PATENT DOCUMENTS

| Re. 28,095 | 7/1974 | Chapin | 405/44 |
|---|---|---|---|
| 3,361,359 | 1/1968 | Chapin | 239/145 |
| 3,672,571 | 6/1972 | Goodricke | 239/145 |
| 3,777,987 | 12/1973 | Allport | 239/542 |
| 3,797,754 | 3/1974 | Spencer | 239/542 |
| 3,799,442 | 3/1974 | Delmer | 239/145 |
| 3,870,236 | 3/1975 | Sahagun-Barragan | 239/542 |
| 3,896,999 | 7/1975 | Barragan | 239/107 |
| 3,903,929 | 9/1975 | Mock | 138/115 |
| 3,954,223 | 5/1976 | Wichman et al. | 239/107 |
| 4,009,832 | 3/1977 | Tiedt | 239/542 |
| 4,022,384 | 5/1977 | Hoyle et al. | 239/542 |
| 4,047,995 | 9/1977 | Leal-Diaz | 156/203 |
| 4,077,570 | 3/1978 | Harmony | 239/107 |
| 4,077,571 | 3/1978 | Harmony | 239/107 |
| 4,126,998 | 11/1978 | Gilead | 405/51 |
| 4,173,309 | 11/1979 | Drori | 239/542 |
| 4,175,882 | 11/1979 | Gilead | 405/43 |
| 4,177,946 | 12/1979 | Sahagun-Barragan | 239/533.1 |
| 4,195,784 | 4/1980 | Gilead | 239/542 |
| 4,247,051 | 1/1981 | Allport | 239/542 |
| 4,346,737 | 8/1982 | Miller | 138/42 |
| 4,385,727 | 5/1983 | Spencer | 239/107 |
| 4,430,020 | 2/1984 | Robbins | 405/43 |
| 4,473,191 | 9/1984 | Chapin | 239/542 |
| 4,474,330 | 10/1984 | Langa | 239/450 |
| 4,534,515 | 8/1985 | Chapin | 239/542 |
| 4,541,569 | 9/1985 | Langa | 239/450 |
| 4,548,360 | 10/1985 | Delmer et al. | 239/542 |
| 4,626,130 | 12/1986 | Chapin | 239/542 |
| 4,722,759 | 2/1988 | Roberts et al. | 156/203 |
| 4,726,520 | 2/1988 | Brown et al. | 239/542 |
| 4,763,842 | 8/1988 | Dunn | 239/542 |
| 4,807,668 | 2/1989 | Roberts | 138/103 |
| 4,874,132 | 10/1989 | Gilead | 239/542 |
| 4,984,739 | 1/1991 | Allport | 239/542 |

Primary Examiner—Andres Kashnikow
Assistant Examiner—Lesley D. Morris
Attorney, Agent, or Firm—Kelly, Bauersfeld & Lowry

[57] ABSTRACT

A drip irrigation tube formed by longitudinally folding an elongated web having thick marginal side portions, and overlapping and sealing the thick marginal sides to form a tube. Discrete emitter elements are disposed at spaced intervals along the web and are formed by embossing or otherwise forming recessed emission grooves in one of the thick marginal edges so as to form a flow path from the inside of the tube to the outside. The emitter elements operate to provide a constant flow rate over a wide range of working pressures by controlled deformation and constriction of size of relatively short emitter passageways formed by a portion of the emission grooves.

35 Claims, 4 Drawing Sheets

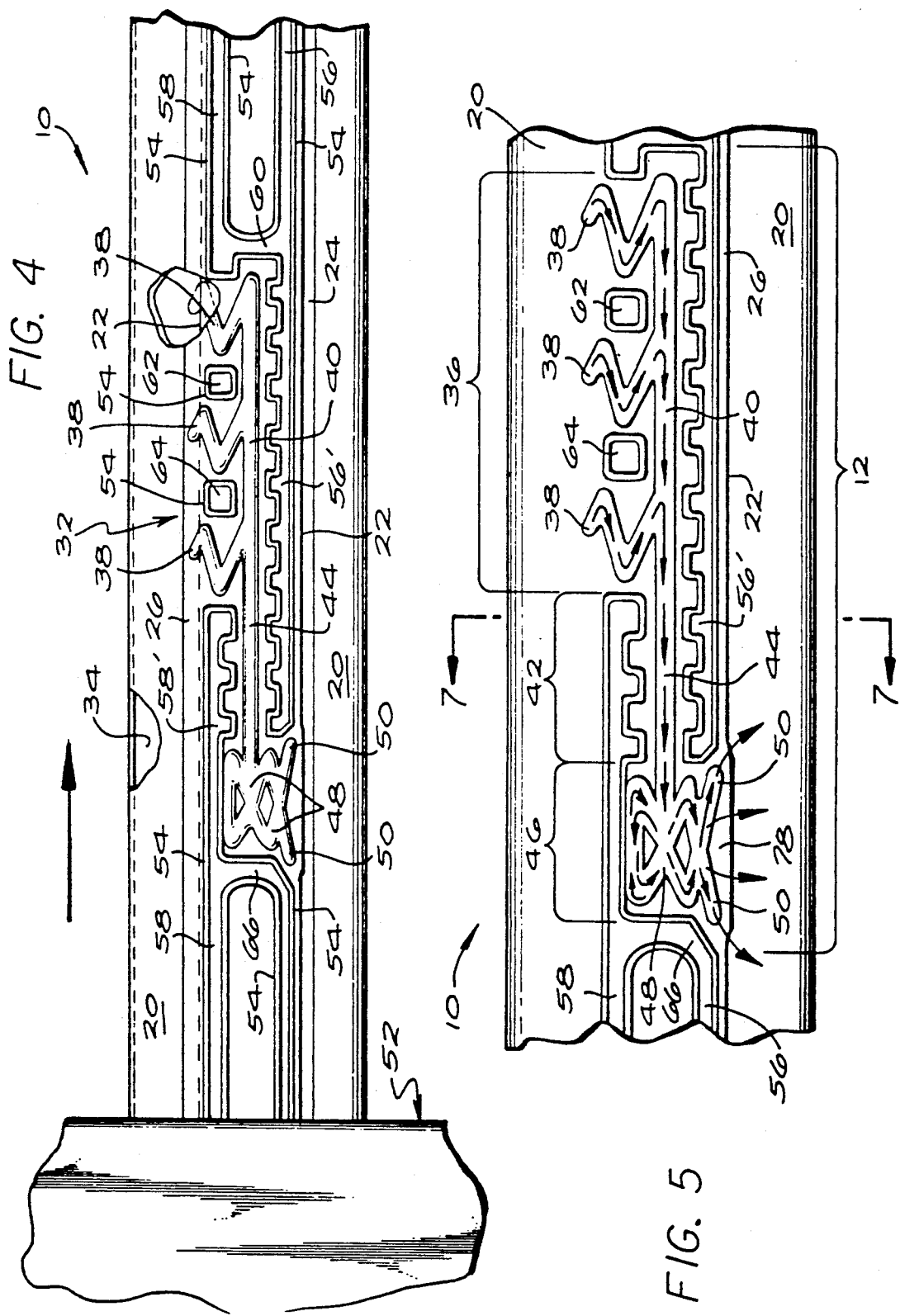

DRIP IRRIGATION TUBE

BACKGROUND OF THE INVENTION

This invention relates generally to irrigation equipment of a type designed for delivering irrigation water to crops and the like at a relatively slow substantially drip flow rate. More particularly, this invention relates to improved and economical continuous tube emitters, wherein the tube has a plurality of spaced emitters through which the flow rate of irrigation water is controlled and regulated in response to water supply pressure.

A variety of so-called continuous tube emitters for irrigation purposes are generally known in the art. Such continuous tube emitters typically comprise an elongated tube of rigid or flexible construction having a plurality of outlet openings formed along its length and through which irrigation water is discharged at a relatively slow, substantially drip flow rate, such as a flow rate less than about one gallon per hour. With such devices, it is intended that irrigation water be discharged at selected points along the tube for delivery to adjacent crops and the like without significant water waste from evaporation and further without significant soil erosion.

Previously available continuous tube emitters have utilized many different structural techniques intended to leak water slowly through outlet openings at spaced intervals along the length of the tube. For example, continuous tube emitters have been suggested with fibrous or other porous substances occluding the outlet openings to permit slow water leakage therethrough, such as those devices depicted in U.S. Pat. Nos. 3,777,987 and 2,799,422. Other continuous tube emitter designs have proposed concentric or multiple tube constructions wherein irrigation water is leaked through a series of small pressure- and flow-reducing orifices. See, for example, the emitter designs shown and described in U.S. Pat. Nos. Re. 28,095; 3,361,359; 3,672,571; 3,903,929; 4,534,515; and 4,626,130. Still other tube emitter designs have proposed relatively complex and elongated or labyrinth flow path configurations for reducing the flow rate and pressure of water discharged through outlet openings, such as those devices depicted in U.S. Pat. No. 4,002,684; 4,077,570; 4,077,571; and 4,763,842. However, in these exemplary continuous tube emitter designs, the requisite low water flow rates have required outlet openings or leakage paths of fixed, small cross-sectional area which are highly susceptible to clogging by dirt or other particulate matter commonly present in most water supply systems. Additionally, such designs have not heretofore been capable of reliably and consistently producing a substantially constant flow rate over the full range of working pressures normally encountered in use.

In U.S. Pat. No. 4,807,668 there is disclosed a continuous tube emitter formed by folding a plastic web lengthwise with the edges overlapped and heat sealed together, and which has a preformed groove along one edge to define an elongated secondary conduit of small cross-section within the seam. Small openings are formed at spaced intervals along the seam of the secondary conduit which function as outlets from the tube. With this construction, the inner wall portion of the overlapped web forms a dividing wall between the main conduit and the secondary conduit, and which is said to be capable of producing a throttling effect by deflecting into the groove in response to increased water pressure within the main conduit so as to reduce the size of the secondary passageway and thus regulate the outlet flow. While several attempts to produce flow control devices have employed this approach, none has been capable of precisely and consistently producing a substantially uniform flow rate over the full range of working pressures normally encountered. This is believed to be due to the inability of the inner wall portion to effectively constrict the size of the secondary passageway in response to pressure increases since that wall is subjected to a tensile force created by the internal water pressure within the main conduit and which prevents the wall from appreciably deforming in a controlled manner into the groove. That is, the internal pressure within the main conduit attempts to inflate the tube, thereby placing the tube wall under a tensile load. As the internal water pressure increases, the tensile force on the tube wall also increases, this tensile force actually reducing the ability of the wall to controllably deform into the groove.

A further continuous tube emitter which is intended to overcome many of the foregoing problems is that disclosed in U.S. Pat. No. 4,726,520, assigned to the assignee of the present application. That continuous tube emitter design provides a flexible plastic tube formed from an elongated thin film web having one or more relatively thicker valve members on one side thereof defining a plurality of valve faces, wherein each valve face includes at least one shallow drip emission groove leading into a valve reservoir of wider cross section and communicating respectively with outlet openings through the web. One longitudinal margin of the web is trimmed to form laterally projecting flaps at longitudinal positions generally corresponding with the valve faces. The web is then rolled upon itself about a longitudinal axis and longitudinally seamed to form the continuous tube emitter with the flaps each internally overlying the valve reservoir and a portion of the drip emission groove of a respective valve face to define one of the flow control units. In use, water pressure within the tube forces the flaps into engagement with the aligned valve faces to restrict and control the rate of water flow through the outlet openings. While the foregoing construction provided an improved and more uniform flow rate over normal working pressure range, it was found that the flap-type construction was difficult to consistently manufacture, and that the level of flow was not always predictable.

Typically, continuous tube drip systems are designed to be operational over a working range of pressures, normally between approximately 6 and 10 pounds per square inch. In the event the continuous tube drip system is employed in hilly terrain, the effective working pressure range may be higher for those portions of the tube lying in valleys, and lower for those portions of the tube overlying the crest of a hill, typically by as much as plus or minus two pounds per square inch. Accordingly, it is highly desirable to be able to compensate for such pressure variations to insure that a substantially uniform flow rate from each emitter along the length of the tube is obtained even though substantial pressure variations are present.

The response of any give emitter in a continuous tube emitter system can be characterized by the formula $Q = c P^x$ where: $Q$ = the emission flow rate at the outlet port of the emitter; $P$ = the pressure inside the emitter tube: c = a constant coefficient which can be empirically determined for each type emitter; and x = an emission rate exponent. From this equation, it can be seen that if the emission exponent equals one, then the emission rate is directly proportional to the pressure inside the emitter tube. That is, if the pressure within the tube doubles, the flow rate from the emitter will double. For an emission rate exponent equal to zero, on the other hand, the emission rate is constant regardless of pressure inside the emitter tube. Thus, for any emission rate exponents value greater than zero but less than one, the emitter will have a pressure compensating characteristic. Since it is always desirable to have a substantially constant flow regardless of the water pressure within the emitter tube, it is therefore desirable to attempt to obtain an emission rate exponent as close to zero as possible.

As will become more apparent hereinafter, the present invention provides a drip irrigation tube having discrete emitter elements which are capable of producing a substantially constant outlet flow rate over the entire range of working pressures typically encountered in use, and whose emission rate exponent is extremely close to zero.

SUMMARY OF THE INVENTION

The drip irrigation tube of the present invention is formed by using a flexible plastic web of particular construction which is folded longitudinally with its side margins overlapped and sealed in a precise manner to form a tubular-shaped body with a central main conduit for receiving pressurized water. Discrete emitter elements are formed in the overlapped margins at spaced intervals along the tube, and operate in a highly reliable and predictable manner to produce a substantially constant flow rate over the full range of working pressures typically encountered during use.

The drip irrigation tube of the invention can be economically and easily formed in large quantities using conventional plastic fabrication techniques, and employs a novel individual emitter design which operates as a variable size orifice capable of precise flow regulation in response to varying pressures, yet which also has a highly reliable flushing mode for clearing the emitter of grit or particulate matter with each irrigation cycle. The principle of operation for achieving flow regulation in response to pressure variations within the main conduit is through controlled and predictable constriction of a relatively short length emitter passageway formed in each emitter. Constriction of the emitter passageway is effected by deformation of relatively thick bonded wall portions of the tube which deform, in a manner similar to an end supported flexible beam under load, to progressively reduce the cross-sectional size of the passageway as one wall of the passageway experiences a compressive force and the opposed wall experiences a tensile force created by the pressure of the water within the main conduit.

The emitter passageway is formed by an emission groove embossed into the surface of one or a pair of laterally spaced relatively thick walls formed along the marginal side edges of the web, and is interconnected with embossed inlet and outlet passageways. The thick walls are overlapped and bonded together as an integral unit to form the final tube with the emitter passageway extending longitudinally and the inlet and outlet passageways providing a flow path from the main conduit through the emitter passageway to the outside of the tube.

As internal pressure within the main conduit increases, the thick walls deform toward an arcuate shape with the inner thick wall experiencing a compressive force and the outer thick wall experiencing a tensile force. The compressive and tensile forces in the thick walls cause the walls in the area of the emitter passageway to move toward each other, thereby to constrict the size of the emitter passageway in response to internal water pressure within the main conduit of the tube.

The drip irrigation tube of the invention provides relatively large inlet and outlet openings to insure that blocking or clogging of the emitter does not occur, and provides a flushing mechanism by which any particles trapped in the emitter passageway can be flushed therefrom with each cycle of operation. When not in use, the outlet openings are effectively sealed to prevent the intrusion of roots and the ingestion of grit and foreign particles which might form blockages in the system.

BRIEF DESCRIPTION OF THE DRAWINGS

FIG. 4 is an enlarged fragmented plan view with portions broken away to illustrate the underlying structure of the drip irrigation tube of the present invention after bonding to form the final tube shape;

FIG. 5 is an enlarged fragmented plan view similar to FIG. 4 with arrows added to schematically represent the flow of water though an emitter element of the tube;

DETAILED DESCRIPTION OF THE PRESENTLY PREFERRED EMBODIMENT

Figure 1:
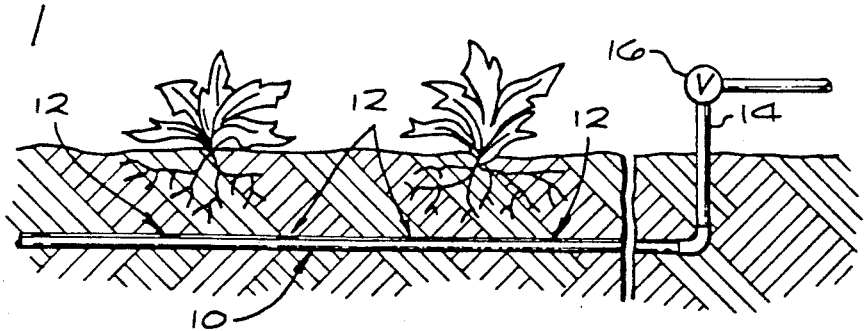
FIG. 1 is a schematic representation depicting subterranean installation and use of a drip irrigation tube embodying the novel features of the invention.

As shown in the exemplary drawings, the present invention is embodied in a drip irrigation tube, referred to generally in FIG. by the reference numeral 10, provided with a plurality of discrete emitter elements, designated generally 12, longitudinally spaced a preselected distance apart along the tube for the controlled supply of irrigation water to agricultural crops and the like. The drip irrigation tube 10 is formed as an elongated, collapsible thin-walled tube adapted for appropriate connection to a water supply pipe 14 including a suitable control valve 16 for controlling the supply of a flow of water under pressure. As illustrated in FIG. 1, the drip irrigation tube 10 is particularly suitable for use in subterranean irrigation applications, although the tube can be installed above the ground surface, if so desired.

The drip irrigation tubing 10 is manufactured from relatively inexpensive materials to provide a simple and highly economical continuous tube drip irrigation system which operates reliably and effectively to deliver a controlled and substantially fixed rate of water flow over a relatively wide range of water supply pressures. More particularly, the drip irrigation tubing 10 is formed from a relatively inexpensive thin-walled generally flat strip or web 18 of a flexible plastic material, such as linear low density polyethylene, which can be processed economically and at high production rates to form the elongated collapsible tube. Moreover, the individual drip emitter elements 12 (best seen in FIGS. 4 and 5) are formed integrally with the web 18 during fabrication of the drip irrigation tube 10 without requiring the addition of other parts or materials.

Figure 2:
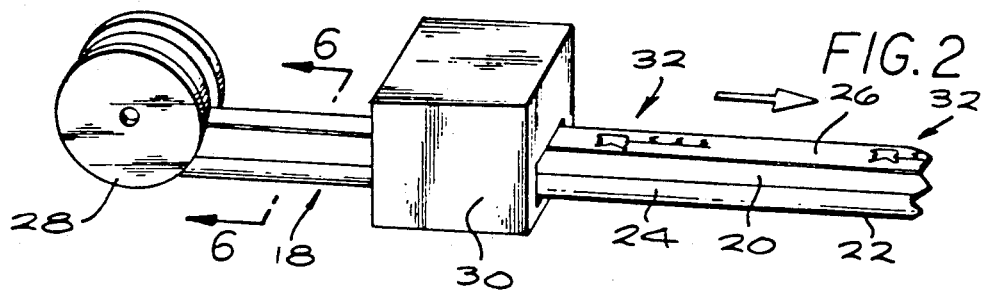
FIG. 2 is a fragmented perspective view illustrating formation of emission grooves into the web used to form the drip irrigation tube of the present invention.
Figure 3:
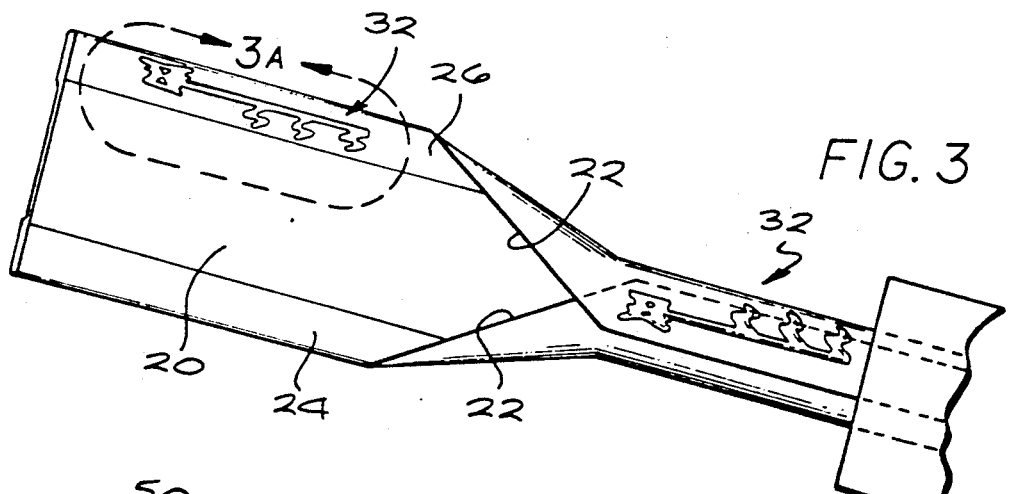
FIG. 3 is an enlarged fragmented perspective view illustrating the folding of the web of FIG. 2 into tubular shape.
Figure 3A:
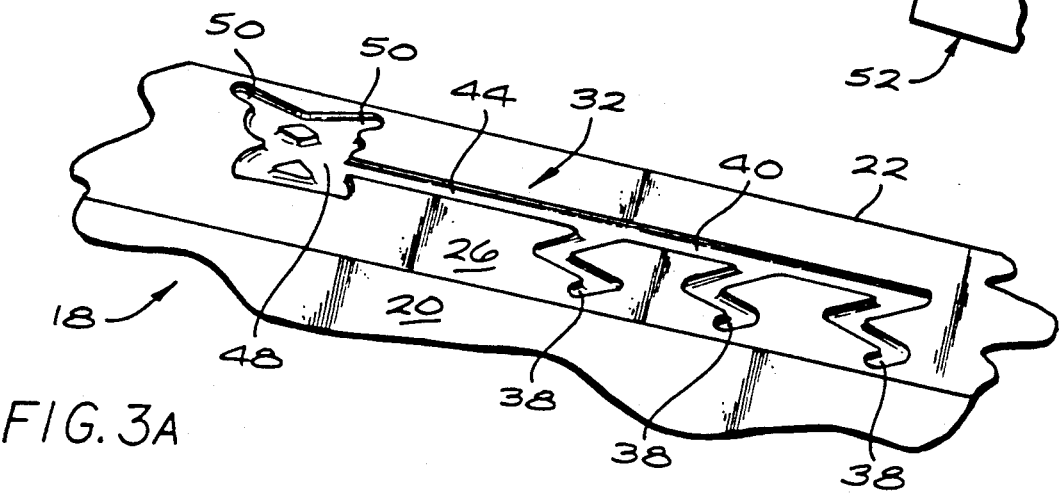
FIG. 3A is an enlarged fragmented perspective view substantially corresponding with the encircled region 3A of FIG. 3.
Figure 6:
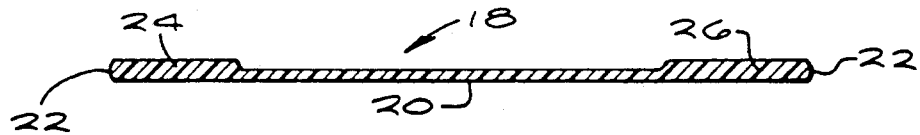
FIG. 6 is an enlarged cross-sectional view of the web taken substantially along line 6—6 of FIG. 2.

As best seen in FIGS. 2, 3 and 6, in accordance with the invention, the web 18 for forming the drip irrigation tube 10 is formed to have a width selected in accordance with the desired diametric tube size, and for reasons that will become more apparent hereinafter, is constructed to have a central, relatively thin wall portion 20, hereinafter referred to as the tube wall, and relatively thicker, laterally spaced wall portions extending longitudinally along marginal sides 22 of the web, one being hereinafter referred to as the inner thick wall 24, and the other as the outer thick wall 26.

Following formation of the web 18, which preferably can be formed by a continuous extrusion process and stored for subsequent use, for example on a reel 28, the web is fed through an apparatus, generally designated 30, which embosses or otherwise forms into the surface of one of the thicker wall portions, herein the outer thick wall 26, recessed emission grooves, generally designated 32 in FIG. 2, spaced at the preselected locations along the length of the web. Thereafter, as shown in FIG. 3, the embossed web 18 is folded into a tubular configuration with the outer thick wall 26 overlying the inner thick wall 24, and the overlapped walls are selectively bonded together, preferably by heat sealing, in a specific bonding pattern to seal the tube and form the discrete emitter elements 12 spaced along the tube 10. When formed, the drip irrigation tubing 10 will define a main water supply conduit 34 of relatively large diameter, and which can be coupled with the water supply pipe 14 for the admission of pressurized water into the tube, it being understood that the end of the tube remote from the supply end will be closed by suitable means such as clamping or sealing so that the water within the tube can escape only through the discrete emitter elements 12.

With specific reference to FIG. 5, the emission grooves 32 of the emitter elements 12 are formed to define three interconnected functional sections. The first or inlet section, generally designated 36, defines a plurality of emitter inlet passageways 38 leading in a generally lateral direction from the main conduit 34 to a longitudinally extending inlet flow collector or manifold passageway 40; the second or regulating section 42 defines a main emitter passageway 44 of relatively short length extending longitudinally along the center portion of the outer thick wall 26; and the third or outlet section 46, defines a plurality of emitter outlet reservoir passageways 48 leading to laterally directed exit passageways 50. When the web 18 is folded into tubular shape, the inner and outer thick walls 24 and 26 are overlapped so that the outer thick wall having the emission groove 32 overlies the inner thick wall with the inner thick wall separating the emission groove from the main conduit 34 of the tube 10. In overlapping the inner and outer thick walls 24 and 26, it is important that the entrance end of each of the inlet passageways 38 extend beyond the side edge 22 of the underlying inner thick wall 24 so that the entrance end will be exposed to the main conduit 34 of the tube 10 to provide a passage for water within the main conduit into the emission groove 32.

Once the web 18 has been folded with the inner and outer thick walls 24 and 26 overlapped, the tubular-shaped web 18 is then passed through a suitable bonding apparatus, generally designated 52, preferably a heated and contoured pressure roller device of generally conventional design, which selectively applies a weld to the overlapped thick walls 24 and 26 to bond those walls together into an integral structure. In this instance, as best seen in FIGS. 4 and 5, relatively wide weld area lines are formed in a preselected pattern cooperating with the three functional sections of the emission groove 32 to further define the emitter passageways and, for reasons which will become more clear hereinafter, to increase the structural stiffness of the thick wall portions 24 and 26 of the tube 10. In this latter respect, the weld area lines are each herein formed to have raised marginal ribs 54 which aid in providing structural rigidity to the weld areas.

As viewed from top to bottom in the fragmentary view of FIG. 4, the overlapped inner and outer thick walls 24 and 26 are welded together between emitters 12 with a pair of parallel weld lines 56 and 58 spaced to approximately mate with the locations of the web lateral side edges 22 so as to close and seal the tube between each emitter element. Adjacent the inlet section 36, a transverse weld line 60 is formed to interconnect the two parallel weld lines 56 and 58, and defines one end of the inlet section of the emitter 12. An extension 56, of the parallel weld line 56 adjacent the lateral edge 22 of the embossed outer thick wall 26 extends along one side of the emitter passageway 44, and terminates at the entrance of the outlet section 46 of the emitter 12. This weld line extension 56' forms the bottom of the inlet section 36 of the emitter 12, and at its terminal end, the beginning of the outlet section 46.

Disposed on the side of the overlapped thickened walls 24 and 26 opposite the weld line extension 56' are two discrete weld spots 62 and 64, herein generally square in shape, and which are disposed between the inlet passageways 38 to separate those passageways. Extending along the side of the emitter passageway 44 on the side opposite the weld line extension 56' and parallel with the emitter passageway is a further weld line 58, forming the beginning of the parallel weld line 58, and which cooperates with the opposed weld line extension 56' to define the sides of the regulating section 42, as well as the side of the outlet section 46 of the emitter 12. A final lateral weld line 66 interconnects the beginning of the next two parallel weld lines 56 and 58 with the further weld line 58' adjacent the outlet passageways 48 to form the end of the outlet section 46. Notably, no weld is formed to close the exit passageways 50 of the outlet section 46 to the exterior of the tube 10, nor to restrict the flow of water from the main conduit into the inlet passageways 38.

As represented by the arrows of FIG. 5, it can be seen that the emission groove 32 bounded by the overlapped thick walls 24 and 26 and the various weld lines, cooperate to define three discrete inlet openings via inlet passageways 38 leading from the main conduit 34 of the tube 10. Notably, the three inlet passageways 38 provide a water inlet opening which is substantially larger than the size of the emitter passageway 44 so that if one or even two of the inlet passageways were to become clogged or blocked, a sufficient water flow to feed the emitter passageway would still be obtained.

From the inlet passageways 38, the water flows into the manifold passageway 40 and through the emitter passageway 44 where the principal flow regulation takes place, and then to the outlet section 46. At the outlet section 46, the grooves bounded by the overlapped thick walls 24 and 26, and the weld lines 58, and 66 cooperate to form a tortuous path through the reservoir passageways 48 to the exit passageways 50 where the water is discharged from the tube. It should also be noted that the exit passageways 50 also provide a larger area through which water can flow than the area of the emitter passageway 44. Therefore, should one of the exit passageways 50 become clogged or blocked, water can still be discharged from the outlet portion 46.

In accordance with the present invention, the principle of operation for achieving flow regulation in response to pressure variations within the main conduit 34 of the tube 10 is through controlled and predictable constriction of the relatively short emitter passageway 44. Constriction of the emitter passageway 44 is effected by deformation of the overlapped thick walls 24 and 26 in a controlled manner as pressure within the main conduit 34 of the tube 10 increases so that the emitter passageway will have the flow characteristics of a variable size, flow restricting orifice.

Figure 7:
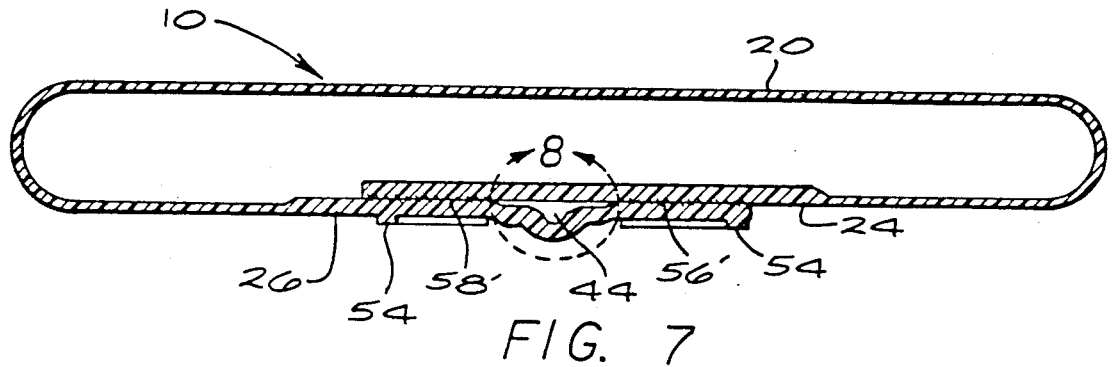
FIG. 7 is an enlarged cross-sectional view taken substantially along the line 7—7 of FIG. 5.
Figure 8:
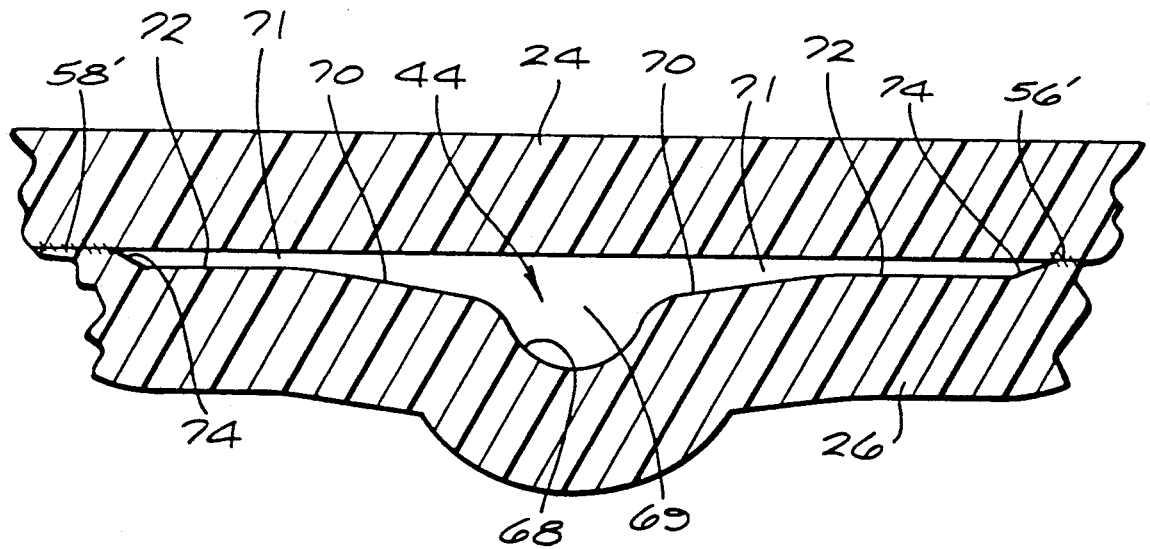
FIG. 8 is an enlarged fragmented cross-sectional view substantially corresponding to the encircled region 8 of FIG. 7.

With principle reference to FIGS. 7 and 8 of the drawings, the emitter passageway 44 is formed with a specific geometry to insure uniform constriction of the passageway for achieving a substantially constant flow of water at all pressures within the working range, yet which provides a relatively large area passageway for flushing particulate matter from the passageway with each cycle of operation. The basic mechanism employed for controlling constriction of the emitter passageway 44 is that of the compressive and tensile forces formed in a flexible beam supported at its ends. When such a beam is subjected to uniform loading along one side, the beam will deflect away from the load and assume an arcuate shape between the supports. This deflection creates a compression force in the surface of the beam exposed to the load, and a tensile force in the opposed surface, thus attempting to move the loaded surface toward the nonloaded surface, and vice versa. By forming the emitter passageway 44 centrally between the bonded inner and outer thick walls 24 and 26, and bonding those walls together to form an integral structure, the inner and outer thick walls act like a flexible beam supported at its ends by the junctions with the tube wall 20.

As best seen in FIG. 7 which is a lateral cross sectional view through the regulating section 42 of the tube 10, the emitter passageway 44 is bounded on one side, herein the lower side, by the embossed emission groove 32 in the outer thick wall 26 and on the opposed side, by the inner surface of the thick wall 24. Extending laterally along the sides of the emitter passageway 44 are the weld lines, specifically the weld line extension 56' and other weld line 58 bonding the inner and outer wall thick 24 and 26 together. Since the inner and outer thick walls 24 and 26 are bonded together to form an integral structure along the sides of the emitter passageway 44, the effective stiffness, and hence resistance to deformation, of the bonded portions extending along the emitter passageway is considerably greater than that of the unbonded portions of the inner and outer wall defining the upper and lower boundaries of emitter passageway. Moreover, the stiffness of the bonded portions is further increased by the provision of the raised ribs 54, the weld extension 56' and lateral weld line 66 having a square wave shaped pattern along the sides of the emission passageway to enhance rigidity.

In this instance, as best seen in FIG. 8, the embossed emitter passageway 44 is formed in the outer thick wall 26 to define a central wall portion 68 of substantially semi-circular shape, joined with opposed laterally directed inclined side wall portions 70 which, in turn, are interconnected with substantially horizontal wall portions 72 extending parallel with, but spaced from the surface of the adjacent portion of the inner thick wall 24, herein by end walls 74. The emitter passageway 44 thus formed comprises a relatively large central main emitter passage 69 with laterally projecting wedge shaped side passages 71 extending to the junction of the bonded inner and outer thick walls 24 and 26.

Figure 9:
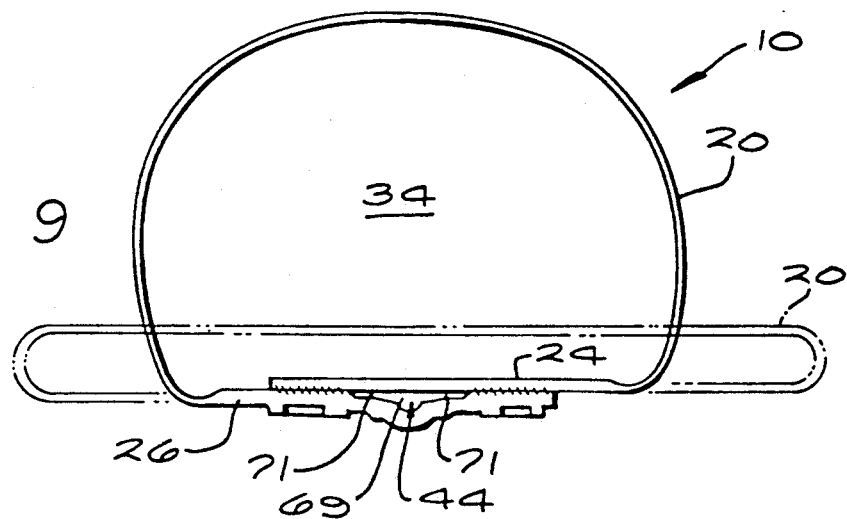
FIG. 9 is a schematic cross-sectional representation of the tube of the present invention as water pressure inside the tube initially approaches the working pressure range, and including in broken line representation, the shape of the tube when not in operation.

When operated, as water under pressure is initially admitted into the main conduit 34 of the tube 10, the tube begins to inflate from its no pressure flat condition, represented by broken sides in FIG. 9, to a more circular cross-sectional configuration shown by the solid line position. Notably, initial inflation is confined to the relatively thinner tube wall 20, the considerably thicker inner and outer walls 24 and 26 remaining in the substantially flat condition since the pressure is insufficient to overcome their higher relative stiffness and effect deformation. Thus, at least initially, the tube wall 20 inflates by pivoting about its junctions with the inner and outer thick walls 24 and 26.

During this initial phase of the operating cycle, since the inner and outer thick walls 24 and 26 remain substantially flat and undeflected, the cross-sectional size of the emitter passageway 44 includes both the main emitter passage 69 and all of the areas of the wedge shaped side passages 71. As will become apparent, in this condition the cross-sectional size of the emitter passageway 44 is considerably greater than when the internal pressure within conduit 34 of the tube 10 has reached its working range, and particulate matter that may have become trapped in the emitter passageway will be flushed therefrom into the outlet section 46, and eventually flushed out through the exit passageways 50.

Figure 10:
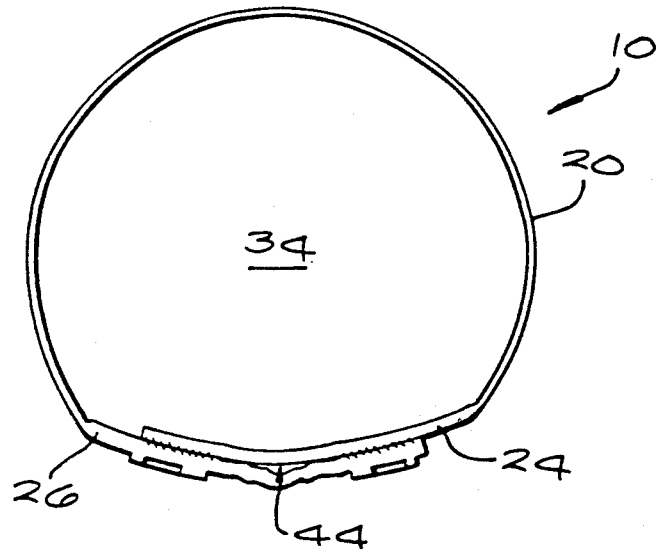
FIG. 10 is a view similar to FIG. 9 but showing the tube shape when the initial water pressure is within the working pressure range.

As the internal water pressure within the conduit 34 of the tube 10 initially approaches the lower level of the working pressure range, the pressure of inflation against the tube wall 20 and the inner and outer thick walls 24 and 26 cause the inner and outer thick walls to begin to deflect toward an arcuate shape, shown in FIG. 10. During this initial deflection of the integral inner and outer thick walls 24 and 26, the inner thick wall is subjected to compression and the outer thick wall is subjected to tension. Since the unbonded portions of the inner and outer thick walls 24 and 26 are relatively less stiff than the bonded portions, the inner thick wall portion overlying the emitter passageway 44 will deflect toward the outer thick wall, and the outer thick wall and its embossed groove 32 will deflect toward the inner thick wall, thereby closing the spaces defined between the horizontal wall portions 72 and the adjacent portion of the inner thick wall.

As the internal pressure within the conduit 34 continues to rise, the inner and outer thick walls 24 and 26 continue to bend about a radius extending within a plane through the center of the tube 10 but whose length is considerably greater than that of the radius of curvature of the tube wall 20 and which becomes shorter as the internal pressure within the conduit continues to increase. Further deflection of the inner and outer thick walls 24 and 26 increases the compressive load experienced by the inner thick wall as well as the tensile force in the outer thick wall, thereby producing a further and progressive closing toward the main emitter passage 69 of the inclined wall portions 70 against the opposed inner thick wall, and causing emitter passageway 44 to be further compressed to a smaller overall cross-sectional size.

Figure 11:
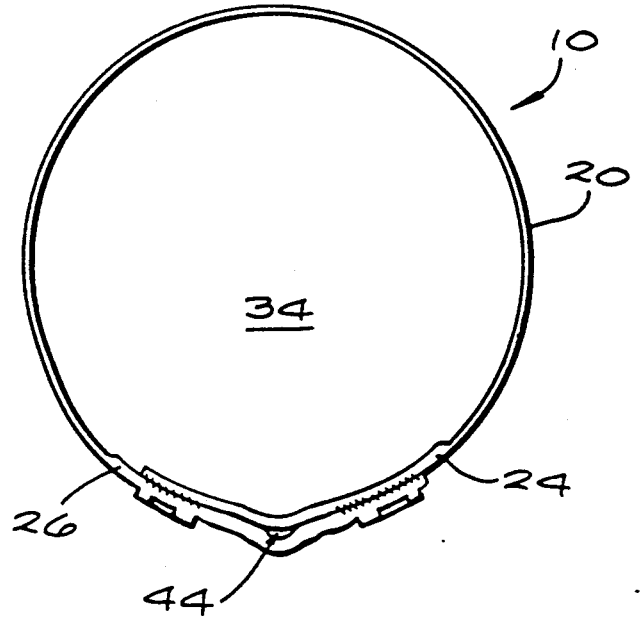
FIG. 11 is a view similar to FIG. 10 but showing the tube shape when the internal water pressure has exceeded the working pressure range.

Compression of the emitter passageway 44 in turn causes an increase in pressure drop to occur as water flows between the inlet section 36 and the outlet section 46, thereby to control the rate of water flow therethrough, and maintain that rate at a substantially constant level as pressure builds within the conduit 34. Ultimately, as shown in FIG. 11, when the internal pressure within the main conduit 34 exceeds the working pressure range, the radius of curvature of the inner and outer thick walls 24 and 26 will approximate that of the tube wall 20, and the emitter passageway 44 will be constricted to an area less than the size of the main emitter passage 69 due to the high compressive and tensile forces created in the inner and outer thick walls. In this condition, the emitter passageway 44 will no longer experience controlled constriction, and the flow rate will not remain substantially constant with further increases in the internal water pressure within the conduit 34.

At this juncture, it should be noted that as the pressure builds within the main conduit 34, the inner thick wall 24 underlying the inlet passageways 38 will be pressed firmly against the underside of the outer thick wall 26. Thus, the inlet passageways 38 will restrict the size of the water flow passages into the inlet section 36 to the cross sectional area of each of the embossed inlet passageways. This restriction will have a small secondary effect on reducing the pressure of the water flowing from the main conduit into the emitter passageway 44, and will also function to form "strainers" which will insure that particles carried by the water in the conduit which are large enough to potentially block the emitter passageway will not enter the inlet section 36 during operation of the emitter 12. As previously noted, since there are multiple inlet passageways 38, should one or two such passageways become clogged and blocked, there will still remain another inlet passageway to insure an adequate water supply to feed the emitter passageway 44.

Another feature of the structure of the tube 10 is that of the outlet section 46 and its associated reservoir passageways 48 and exit passageways 50. In the uninflated, flat condition of the tube 10 when not in use, the exit passageways 50 terminate under the marginal edge of the outer thick wall 26 which essentially closes those passageways in the absence of water pressure. Thus, in the uninflated condition, the marginal edge defines a flap 78 which can operate to restrict the entry of dirt and other foreign particles into the emitter elements 12, such as might occur after a watering cycle has been completed and the tube 10 is drained. The flap 78 also functions to act as a barrier to the entry of roots into the emitter 12 since in the uninflated condition, the exit passageways 50 are essentially closed to the outside of the tube 10.

Once the tube 10 is inflated by pressurized water within the conduit 34, the flap 78, which is subjected to a tensile force as the outer thick wall 26 begins to deform, will lift, thereby producing a slot-like outlet opening through which water can be discharged over the full length of the exit passageways 50. This provides the further advantage of permitting a large outlet opening through which grit or particles previously flushed from the emitter passageway 44 can pass, and insures that should any exit passageway 50 become blocked, ample outlet opening area will remain for water to be discharged from the tube 10.

In tests of a continuous drip irrigation tube 10 constructed from a linear low density polyethylene material in accordance with the present invention, using a tube wall 20 width of approximately 1.5 inches and a thickness of 0.006 inches (6 mils) with inner and outer thick walls 24 and 26 each having a lateral width of approximately 0.5, inches and a thickness of 0.016 inches (16 mils), it was found that a flow rate substantially equal to 0.27 gallon per hour could be reliably and consistently produced from each emitter element 12 over the full range of working pressures between 4 pounds per square inch and 12 pounds per square inch. In that instance, the emitter passageway 44 was formed to have a length of 0.65 inches with the radius of the semicircular wall 68 being 0.009 inches, and the inclined walls 70 each having a length of 0.026 inches and spaced a maximum distance of 0.006 inches from the surface of the adjacent inner thick wall 24. The length of each horizontal wall 72, including the end walls 74, was formed to be 0.035 inches and spaced 0.0002 inches from the surface of the adjacent inner thick wall 24. These dimensions produced an emitter passageway 44 having a cross-sectional size of approximately 0.00058 square inches in the absence of water within the tube 10.

When the tube 10 having the foregoing construction was placed in operation by admitting pressurized water into the conduit 34, it was observed that when the internal pressure within the conduit reached approximately 2 pounds per square inch, the portion of the passage 71 formed by the horizontal walls 72 closed, thus constricting the size of the emitter passageway 44 to approximately 0.0003 square inches. Thereafter, when the internal pressure within the conduit 34 reached approximately 8 pounds per square inch, the area of the emitter passageway 44 had reduced to 0.00013 square inches. At 12 pounds per square inch internal pressure within the conduit 34, the area of the emitter passageway had constricted to 0.00011 square inches. Throughout the full range of working pressures between 4 and 12 pounds per square inch within the conduit 34, it was found that each emitter 12 had an emission rate exponent of approximately 0.119, a value substantially lower than any heretofore believed obtainable in a continuous tube drip emitter system.

From the foregoing, it should be appreciated that the drip irrigation tube 10 of the present invention provides a highly reliable and effective device which can be economically and easily formed using conventional plastic fabrication techniques. The tube 10 of the invention employs the principles of a short path, variable orifice emitter in that pressure reduction is obtained by using a constricted passageway of relatively short length over which the requisite pressure drop occurs, yet provides a large flow area for particle flushing on initiation of an irrigation cycle, while still providing a highly reliable pressure compensation mechanism which insures that a substantially constant flow rate is maintained over the full range of normal working pressures. Moreover, the tube 10 provides large inlet and outlet openings to insure that blocking or clogging of the emitter elements does not occur, and provides a flushing mechanism by which any particles trapped in the emitter passageway can be flushed therefrom with each cycle of operation. When not in use, the exit passageways are effectively sealed to prevent the intrusion of roots and the ingestion of grit and foreign particles which might form blockages in the system.

While the foregoing discussion has been made in connection with the presently preferred embodiment of the invention, it will also be apparent that modifications and variations therein can be made without departing from the spirit and scope of the invention as defined by the appended claims.

I claim:

1. A drip irrigation tube adapted to be coupled to a source of pressurized water for supplying irrigating water at a substantially constant flow rate over a range of source pressures between a preselected minimum and maximum to a plurality of discrete locations spaced longitudinally along the tube, said drip irrigation tube comprising:

an elongated web of predetermined width, said web having a central wall portion of relatively small thickness and a pair of laterally spaced wall portions of relatively greater thickness extending longitudinally along the side edge portions of said web, said web being rolled upon itself with said relatively thick wall portions in substantially overlapped confronting relation with each other to form an elongated tube having an inside and an outside and defining an internal conduit for receiving water under pressure from the source;

a plurality of discrete emitter elements formed at spaced longitudinal locations along said tube, each of said emitter elements being formed by a recessed groove in one of said relatively thick wall portions and disposed to form passageways for communicating water from said internal conduit to said outside of said tube between said overlapped confronting thick wall portions;

means bonding said overlapped thick wall portions to each other around said groove such that unbonded portions including said groove define an inlet passageway section, a regulating passageway section and an outlet passageway section, the passageways of said inlet and said outlet sections each having a cross-sectional size substantially larger than the cross-sectional size of the passageway of said regulating section;

said passageway of said regulating section extending longitudinally along said web and being deformable to reduce its cross-sectional size in response to an increase of water pressure within said internal conduit.

2. A drip irrigation tube as set forth in claim 1 wherein said deformation of said regulating passageway is controlled by deformation of said bonded confronting relatively thick wall portions in response to the pressure of water within said internal conduit.

3. A drip irrigation tube as set forth in claim 2 wherein said bonded confronting relatively thick wall portions have a substantially greater resistance to deformation than said central relatively smaller thickness wall portion.

4. A drip irrigation tube as set forth in claim 3 wherein said unbonded portions of said confronting relatively thick wall portions have less resistance to deformation than said bonded confronting relatively thick wall portions.

5. A drip irrigation tube as set forth in claim 4 wherein said regulating passageway includes a relatively large central portion and laterally oppositely extending and generally converging smaller side portions.

6. A drip irrigation tube as set forth in claim 5 wherein said deformation of said regulating passageway occurs by constricting the cross-sectional size of said regulating passageway.

7. A drip irrigation tube as set forth in claim 6 wherein said constriction closes off said side portions progressively toward said central portion as the pressure within said internal conduit is increased.

8. A drip irrigation tube as set forth in claim 1 wherein said tube has a generally flat cross-sectional shape when no water pressure is present in said internal conduit and is inflated to a generally cylindrical shape when pressurized water from the source is admitted into said chamber, the cross-sectional shape of said central thin wall portion being defined by a radius of curvature shorter than the radius of curvature of said overlapped relatively thick wall portions for source pressures below the predetermined maximum pressure.

9. A drip irrigation tube as set forth in claim 8 wherein said deformation of said regulating passageway is controlled by arcuate deformation of said bonded confronting relatively thick wall portions in response to the pressure of water within said internal conduit.

10. A drip irrigation tube as set forth in claim 9 wherein said unbonded portions of said confronting relatively thick wall portions have less resistance to deformation than said bonded confronting relatively thick wall portions.

11. A drip irrigation tube as set forth in claim 10 wherein said regulating passageway includes a relatively large central portion and laterally oppositely extending and generally converging smaller side portions.

12. A drip irrigation tube as set forth in claim 11 wherein said deformation of said regulating passageway occurs by constricting the cross-sectional size of said regulating passageway.

13. A drip irrigation device adapted to be coupled to a source of pressurized water for supplying irrigating water at a substantially constant flow rate over a range of source pressures between a predetermined minimum and maximum pressure, said drip irrigation device comprising:

a housing structure defining an internal pressure chamber adapted for connection to the source for receiving water under pressure, said housing structure including first and second interconnected wall portions having substantially different resistance to deformation in response to the pressure of water within said pressure chamber;

said second wall portion including inboard and outboard overlapping wall segments cooperatively defining a regulating passageway therebetween, said inboard and outboard wall segments being joined together along opposite sides of said regulating passageway, said inboard and outboard wall segments further defining inlet and outlet ports on opposite sides of said regulating passageway for communicating said regulating passageway respectively with said pressure chamber and with the exterior of said housing structure;

said second wall portion being deformable in response to water pressure within said pressure chamber to place said inboard wall segment under compression and to place said outboard wall segment under tension and thereby vary the cross sectional size of said regulating passageway to maintain a substantially constant water flow rate discharge through said outlet portion response to water pressure variations between the predetermined minimum and maximum pressures.

14. The drip irrigation device of claim 13 wherein said second wall portion has a substantially greater resistance to deformation then said first wall portion.

15. The drip irrigation device of claim 14 wherein said second wall portion is substantially thicker than said first wall portion.

16. The drip irrigation device of claim 13 wherein said regulating passageway is oriented with respect to said housing structure such that in response to water pressure within said pressure chamber, said inboard wall segment is subjected to a compression force acting generally transversely with respect to said regulating passageway, and said outboard wall segment is subjected to a tension force acting generally transversely with respect to said regulating passageway.

17. The drip irrigation tube of claim 16 wherein said housing structure comprises an elongated tube, said regulating passageway being oriented to extend generally longitudinally with respect to said tube.

18. The drip irrigation device of claim 13 wherein said inboard and outboard wall segments are disposed in overlapping confronting relation, and further including means for bonding said inboard and outboard wall segments to each other to define bonded portions extending along opposite sides of an unbonded portion corresponding with said regulating passageway.

19. The drip irrigation device of claim 18 wherein one of said inboard and outboard wall segments has a recesses groove formed therein and cooperating with the other of said wall segments and with said bonding means to define said regulating passageway.

20. The drip irrigation device of claim 18 wherein said bonded portions of said inboard and outboard wall segments have a substantially greater resistance to deformation then said unbonded portion.

21. The drip irrigation device of claim 13 wherein said regulating passageway includes a relatively large central portion in combination with laterally oppositely extending and generally converging smaller portions.

22. The drip irrigation device of claim 21 wherein said second wall portion is deformable in response to water pressure increase within said pressure chamber initially to constrict said smaller portions of said regulating passageway upon pressure increase substantially to the predetermined minimum pressure, and thereby to constrict said large central portion of said regulating passageway upon further pressure increase from said predetermined minimum substantially to said predetermined maximum pressure.

23. The drip irrigation device of claim 13 wherein said housing structure is inflatable in response to increased water pressure within said pressure chamber.

24. The drip irrigation device of claim 13 wherein said inboard and outboard wall segments of said second wall portion define said regulating passageway at a plurality of discrete locations.

25. The drip irrigation device of claim 13 wherein said housing structure comprises an elongated tube, and further wherein said inboard and outboard wall segments of said second wall portion define said regulating passageway at a plurality of discrete locations spaced longitudinally along said tube.

26. The drip irrigation device of claim 13 wherein said housing structure is inflatable in response to increased water pressure within said pressure chamber, and further wherein said second wall portion has a substantially greater resistance to deformation than said first wall portion, and said second wall portion at said regulating passageway having a resistance to deformation substantially less than said second wall portion along opposite sides of said regulating passageway, said second wall portion comprising a deformable beam with opposite ends joined to said first wall portion, the junctions between said first and second wall portions forming pivotal support points for the ends of said deformable beam.

27. A drip irrigation tube for coupling to a source of pressurized water to supply irrigation water at a substantially constant flow rate over a range of source pressures between a predetermined minimum and maximum pressure to a plurality of discrete locations spaced longitudinally along the tube, said drip irrigation tube comprising:

an elongated flexible tube defining an internal pressure conduit adapted for connection to the source for receiving water under pressure, said tube including a first circumferential wall portion of relatively small stiffness interconnected with a second circumferential wall portion of relatively greater stiffness;

said second wall portion including inboard and outboard overlapping wall segments cooperatively defining a plurality of longitudinally spaced discrete regulating passageways therebetween, said inboard and outboard wall segments being joined together along opposite sides of each of said regulation passageways, said inboard and outboard wall segments further defining a plurality of inlet and outlet openings on opposite sides of said regulating passageways respectively with said pressure conduit and with the exterior of said tube;

said second wall portion being deformable in response to water pressure within said pressure conduit to place said inboard wall segment under compression and to place said outboard wall segment under tension and thereby vary the cross sectional size of said regulation passageways to maintain a substantially constant water flow rate discharge through each of said outlet openings in response to water pressure variations between said predetermined minimum and maximum pressures.

28. The drip irrigation tube as set forth in claim 27 wherein said second wall portion has a relatively greater thickness than said first wall portion.

29. The drip irrigation tube as set forth in claim 28 wherein said inboard and outboard wall segments are disposed in overlapping confronting relation, and further including means for bonding said inboard and outboard wall segments to each other to define bonded portions extending along opposite sides of unbonded portions corresponding with said regulation passageways.

30. The drip irrigation tube as set forth in claim 29 wherein one of said inboard and outboard wall segments has a plurality of recessed grooves formed therein and cooperating with the other of said wall segments and with said bonding means to define said plurality of discrete pressure regulation passageways.

31. The drip irrigation tube as set forth in claim 30 wherein said bonded portions of said inboard and outboard wall segments have a substantially greater resistance to deformation than said unbonded portions.

32. The drip irrigation tube as set forth in claim 31 wherein the lateral cross section of each of said regulation passageways includes a relatively large central portion in combination with laterally oppositely extending and generally converging smaller portions.

33. The drip irrigation tube as set forth in claim 32 wherein said second wall portion is deformable in response to water pressure increase within said pressure conduit initially to constrict said smaller portions of said regulating passageways upon pressure increase substantially to the predetermined minimum pressure, and thereby to constrict said large central portions of said pressure passageways upon further pressure increase from said predetermined minimum substantially to said predetermined maximum pressure.

34. The drip irrigation tube as set forth in claim 33 wherein said second wall portion comprises a deformable beam with opposite ends joined to said first wall portion, the junctions between said first and second wall portions forming pivotal support points for the ends of said deformable beam.

35. The drip irrigation tube as set forth in claim 34 wherein said tube is formed of thermoplastic sheet material.

* * * * *